US006938256B2

United States Patent
Deng et al.

(10) Patent No.: US 6,938,256 B2
(45) Date of Patent: Aug. 30, 2005

(54) SYSTEM FOR BALANCE DISTRIBUTION OF REQUESTS ACROSS MULTIPLE SERVERS USING DYNAMIC METRICS

(75) Inventors: Yuefan Deng, Setauket, NY (US); Stephen J. Engel, East Northport, NY (US); Joseph Giustozzi, Plainview, NY (US); Thomas O. O'Brien, Kings Park, NY (US)

(73) Assignee: Galactic Computing Corporation (VG)

( * ) Notice: Subject to any disclaimer, the term of this patent is extended or adjusted under 35 U.S.C. 154(b) by 837 days.

(21) Appl. No.: 09/765,766

(22) Filed: Jan. 18, 2001

(65) Prior Publication Data

US 2001/0039581 A1 Nov. 8, 2001

Related U.S. Application Data

(60) Provisional application No. 60/176,665, filed on Jan. 18, 2000.

(51) Int. Cl.[7] ................................................. G06F 9/46
(52) U.S. Cl. ....................................................... 718/104
(58) Field of Search .................................. 718/104, 101

(56) References Cited

U.S. PATENT DOCUMENTS

| 5,504,894 | A | 4/1996 | Ferguson et al. |
| 5,548,683 | A | 8/1996 | Engel et al. |
| 5,999,965 | A | 12/1999 | Kelly |
| 6,067,580 | A | 5/2000 | Aman et al. |
| 6,070,191 | A | 5/2000 | Narendran et al. |
| 6,167,446 | A | 12/2000 | Lister et al. |
| 6,173,322 | B1 | 1/2001 | Hu |
| 6,463,454 | B1 * | 10/2002 | Lumelsky et al. .......... 718/105 |

* cited by examiner

Primary Examiner—Meng-Al T. An
Assistant Examiner—Camquy Truong
(74) Attorney, Agent, or Firm—Patterson, Thuente, Skaar & Christensen, P.A.

(57) ABSTRACT

A system for distributing incoming client requests across multiple servers in a networked client-server computer environment processes all requests as a set that occur within a given time interval and collects information on both the attributes of the requests and the resource capability of the servers to dynamically allocate the requests in a set to the appropriate servers upon the completion of the time interval. Preferably, the system includes a request table to collect at least two requests incoming within a predetermined time interval. A request examiner routine analyzes each collected request with respect to at least one attribute. A system status monitor collects resource capability information of each server in a resource table. An optimization and allocation process distributes collected requests in the request table across the multiple servers upon completion of said time interval based on an optimization of potential pairings of the requests in the request table with the servers in the resource table. The optimization and allocation process preferably analyzes metrics maintained in the request table and resource table as part of a relational database to allocate requests to servers based on a minimization of the metric distance between pairings of requests and servers. Preferably, the request table is part of a dynamic, relational database and a process of statistical inference for ascertaining expected demand patterns involving said the attributes adds predictive information about client requests as part of the request examiner routine.

13 Claims, 2 Drawing Sheets

SYSTEM FOR BALANCE DISTRIBUTION OF REQUESTS ACROSS MULTIPLE SERVERS USING DYNAMIC METRICS

RELATED APPLICATIONS

This application claims the benefit of U.S. Provisional Application No. 60/176,665, filed Jan. 18, 2000. This application is also related to two co-pending applications that are assigned to the common assignee of the present application, the first of which is entitled "Scalable Internet Engine," Ser. No. 09/709,820, filed Nov. 10, 2000 and the second of which is entitled "Method and System For Providing Dynamic Host Service Management Across Disparate Accounts/Sites," Ser. No. 09/710,095, filed Nov. 10, 2000.

FIELD OF THE INVENTION

This invention relates to computers and digital processing systems requiring coordination of multiple digital processing units. In particular, this invention relates to load balancing or distribution of client requests across multiple servers in a networked computing environment.

BACKGROUND OF THE INVENTION

The Internet has become an increasingly useful tool and means of communication to many people. As the popularity of the Internet has increased, traffic to many Internet service provider (ISP) and application service provider (ASP) sites has become so congested at times that many companies have to impose a limit on the number of users using their sites during peak hours. As a result, a significant loss of business for e-business merchants, user dissatisfaction, and a permanent loss of many potential customers occur. According to at least one source, during the 1999 holiday shopping season, 25 percent of all potential online buyers never completed their online purchases because the e-tail sites of interest had either crashed or were simply too slow. The principle cause of these problems in the case of larger sites was and is an inappropriate distribution of the requests of customers or users (clients) among the sites' resources (servers), namely the multiple content and application servers that are responsible for responding to these requests.

Allocating content and application server resources to respond to a large number of client requests can become rather complex in certain circumstances involving multiple servers at a given site. If it is assumed that there is always at least one server available for each new task that arises, resource assignments may be made in an arbitrary manner, making the resource allocation procedure trivial. To satisfy the assumption underlying this approach to resource allocation, it is generally desirable to create a system design that has abundant resources and strives to conserve them to maintain availability and efficient throughput. In this approach, each client request received at a site is handled as an independent event. U.S. Pat. Nos. 6,173,322, 6,070,191, 5,999,965, and 5,504,894 all describe resource demand distribution schemes that allocate client request among various resources where the client requests are each treated as independent events.

U.S. Pat. No. 6,173,322 is a good example of this approach and describes a system comprised of three host servers each having different request handling capabilities. For illustrative purposes, suppose that hosts H1, H2, and H3 have capabilities C1, C2, and C3 respectively with C3 being the most capable. Further suppose that there are three requests pending, R1, R2, and R3, needing capabilities C1, C2, and C3 respectively. If each request is considered independently and in the order the requests arrive, R1 might be assigned to H3 since this host will serve the request with the least delay. Next, R2 might be assigned to H2 for the same reason. R3 would then suffer if it were assigned to the only remaining host, H1, since H1 is under-powered to handle the request. Alternatively, R3 could wait for H3 to become available. The effect of these kinds of inefficiencies is cumulative; if the same three requests (or their respective equivalents) come in repeatedly and are serviced independently, there will be an ever-diminishing availability of resources until the system saturates and stops responding to new requests. Moreover, Internet demand is not well behaved. Service requests often come in bursts or may back up to form a large backlog for a variety of reasons. As a consequence, it is desirable for the resource allocation procedure to respond in a more sophisticated manner.

Another problem of the request distribution processes described in U.S. Pat. Nos. 6,070,191, 5,999,965, and 5,504,894 is that these processes consider only parameters related to available resources and do not consider the attributes of the incoming client requests. U.S. Pat. No. 6,173,322 parses certain data contained in incoming clients requests, but only for the purpose of applying a static rule to distribute the requests to one of several server groups. Once this has been done, dynamic resource capability rules are applied to assign the request to a server within the group. These rules may operate in consideration of the static rules previously applied, but only after the static rules are first applied.

While existing schemes for distributing client requests among multiple servers have begun to address some of the problems that arise, it would be desirable to provide a system for distributing client requests across multiple servers that was more efficient and robust. Specifically, it would be advantageous to provide a system for distributing client requests across multiple servers that analyzed the attributes of client requests for expected demand patterns with which resource requirements may be associated, allowing for a comparison of the resource needs of incoming client requests with the resources available, and thus improving the capability of the resource allocation scheme to be more adaptive and dynamic from all operating aspects.

SUMMARY OF THE INVENTION

The present invention is a system for distributing incoming client requests across multiple servers in a networked client-server computer environment. The system collects information on both the attributes of the requests and the resource capability of the servers to dynamically allocate the requests in a set to the appropriate servers upon the completion of the time interval. Preferably, the system includes a request table to collect at least two requests incoming within a predetermined time interval. A request examiner routine analyzes each collected request with respect to at least one attribute. A system status monitor collects resource capability information of each server in a resource table at least once during said time interval. An optimization and allocation process distribute collected requests in the request table across the multiple servers upon completion of said time interval based on an optimization of potential pairings of the requests in the request table with the servers in the server table. The optimization and allocation process preferably analyzes metrics maintained in the request table and resource table as part of a relational database to allocate requests to servers based on a minimization of the metric distance between pairings of requests and servers. Preferably, the request table is part of a dynamic, relational database and a process of statistical inference for ascertaining expected demand patterns involving the attributes adds predictive information about client requests as part of the request examiner routine.

The present invention responds to the demanding circumstances described above by shifting from processing each request as an independent event to processing as a set of requests incoming within a predetermined time interval. The requests are processed as a set by collecting the requests incoming within the predetermined time interval, analyzing each of these requests with respect to at least one attribute, collecting at least once during the time interval information about each server's ability and availability, i.e., resource capability information, to handle requests, and distributing the set of requests across the multiple servers upon the completion of the time interval in response to the above actions, and then repeating these steps for each consecutive time interval. This invention has been denominated virtual extended technology (VXT) because it can intelligently run in the background within the confines of current day bandwidth and processing technology.

Resource allocation, the key to optimum throughput, is the real-time intelligent management of system resources. This invention utilizes several interactive decision processes that can consider all operating aspects of a system's resources, both static and dynamic, while balancing the continuously changing competition for these resources. One of the objectives of this invention is to provide a new algorithm for allocating Internet client requests in an intelligent manner to multiple servers to maximize the efficiency and fault tolerance of the resources. Costs of requests within a reasonable time interval are considered simultaneously to produce a solution that is globally effective (i.e., most effective for a site as a whole) at the possible expense of some individual (localized) requests. The objective is further achieved through analysis of attributes of requests as these attributes correlate to request demands on resources and of the just-in-time running status of those resources.

To return to the above example, a more effective solution would look at all three requests simultaneously, and assign R1 to H1, R2 to H2, and R3 to H3. The performance associated with request R1 will receive the nominal service (slightly less than that offered by the above solution) it needs, while R3 will also receive the appropriate level of service in a prompt manner, and the overall performance of the site will therefore be better. This latter solution is considered globally optimal because the number of requests managed per second is maximized and the collective resources are available for the next set of requests sooner.

Requests to a site can vary widely from web surfing, product search, price comparison, and checkout to multimedia access. However, the demand on resources by each kind of request is predictable. The distribution decision-making process of this invention accounts for attributes and behavior of incoming requests and the corresponding compatibility of system hardware and software. Incoming client requests are analyzed to determine their attributes and behavior so that a given request's expected demand on resources can be predicted and resource requirements can be assigned to the request.

One of the components of the invention will perform the extraction of the attributes from incoming requests. An analysis of the effectiveness of the characteristics above as well as the identification of other parameters that may be beneficial can be performed during the requirements analysis task. Extraction of the dynamic attributes will be performed in real-time by VXT's integral system request examiner or status monitor.

The invention learns how to characterize site-specific traffic in several ways. First, it expands or contracts the number of expected demand patterns based on the success of the request classification. In other words, if a live request does not sufficiently match an already existing pattern, a new pattern is created. Also, if the resource requirement parameters for the matching entry are not correct as measured by system experience, either the parameters themselves are adjusted, or a new pattern is created. Conversely, the number of patterns is constrained to minimize the computation required to classify live requests. The pattern set may be reorganized to eliminate unused, redundant, or ineffective entries. This self-organizing and reorganizing paradigm refines parameters by experience and remains vigilant to non-stationary statistical trends. Similarly, the compatibility of the system hardware and software is also provided to the decision-making process. Some of these characteristics are static and known in advance, while others are dynamic and a function of the tasks currently executing. Preferably, a collection of resource capability information for each server includes metrics for CPU and memory availability and connectivity to a proxy server, to a main storage system, and to other content servers. This collection process can be push or pull from the server at certain times and any of several techniques can be implemented for minimal interruption of the main execution on the servers. For example, information can be pulled periodically by the main proxy server, or the main server can be pushed to accept such information from servers when any certain parameter exceeds a predetermined threshold. This performance feedback allows for an informed decision on which request to send to which server.

Once this information is captured for a given interval of time, it must be reduced to a metric representation that can be manipulated to compute the best assignments of client requests to resources. The metrics associated with each request form a requirement data set whose elements represent the requirement level of each of the parameters used in the decision process. The metrics associated with the ability of a particular server to satisfy the request forms a capability data set with each element of this data set having a counterpart in the requirement data set. During operations, each request has its own requirement data set and each server or processing node has its own capability data set. The difference or metric distance between a requirement data set and a capability data set, calculated for any given pairing of client request and server, represents the mismatch (or cost) incurred by the corresponding assignment of the request to the server. If the data sets are identical, the cost is zero.

The assignment of multiple simultaneous requests can be done by one of several routines. The purpose of each routine, however, should be to select a server or processing resource for each client request so that the sum of all the costs, for the combination of resource and request pairings, is minimized. The solution can be found by using one of several algorithms. Some algorithms find a perfect solution but require considerable processing, while others will find a nearly optimal solution quickly. Often, the nearly optimal solution is good enough to satisfy the presently existing circumstances.

DESCRIPTION OF THE PREFERRED EMBODIMENT

Figure 2:
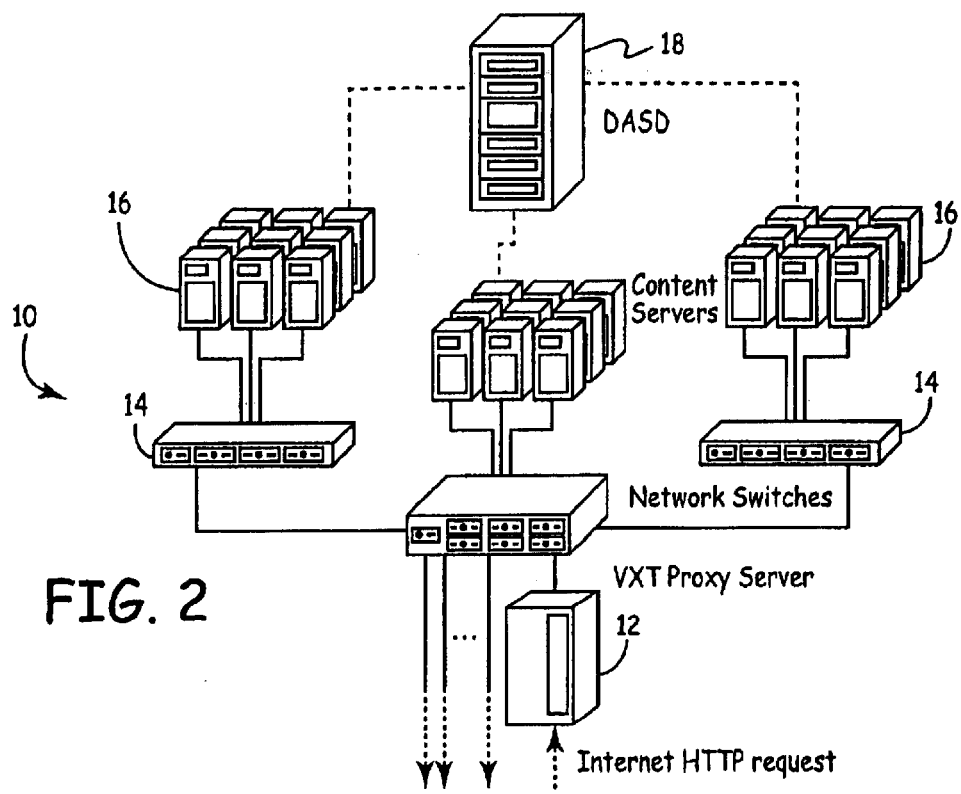
FIG. 2 is a diagrammatic view of the main interacting elements with a system with multiple servers for responding to client request, including a proxy server, content servers, switches, and storage system.

FIG. 2 shows a typical configuration of a system (10) having multiple resources that may be allocated to respond to client requests received from the Internet. A proxy server (s) (12) receives the client request from the Internet and using the VXT (100), as will be described shortly, distributes those requests via network switches (14) to one of the multiple content/application servers (16) which preferably have access to a common DASD storage unit (18) on which information pertinent to the client requests may be stored. As will be discussed in connection with FIG. 3, it will be understood that the present invention is applicable to numerous configurations of server resources in a system (10). In one embodiment as described in the previously identified applications entitled "Scalable Internet Engine" and "Method and System For Providing Dynamic Host Service Management Across Disparate Accounts/Sites", servers are dynamically allocated among multiple sites or accounts. In this embodiment, the present invention is applicable not only for allocating server resources among requests in a single account, but may also be extended to provide additional information for how to allocate servers among different accounts over time.

Figure 1:
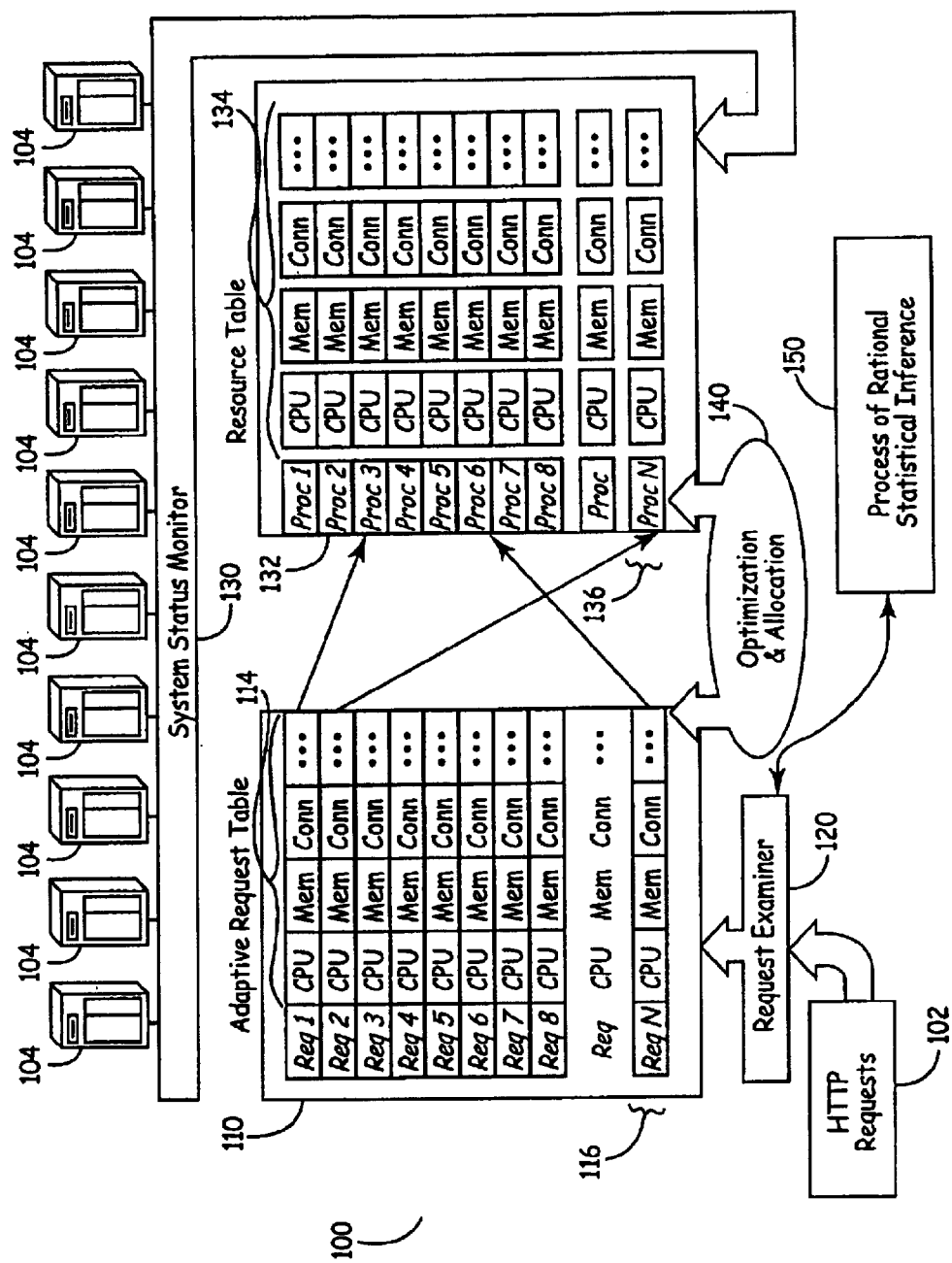
FIG. 1 is a diagrammatic view of the present invention implemented across servers in a networked computing environment.

In the preferred embodiment of the VXT (100) as shown in FIG. 1, the invention comprises a request table (110) to collect at least two requests (102) incoming within a predetermined time interval, a request examiner process (120) to analyze each said collected request with respect to at least one attribute, a system status monitor (130) to collect resource capability information of each server (104), an optimization and allocation process (140) to distribute said collected requests in the request table (110) across the multiple servers upon completion of said time interval in response to said attributes and said resource capability information. Incoming client requests (102) are analyzed for their respective attributes by the request examiner process (120). This attribute information is then sent to the request table (110). Preferably, the system status monitor (130) collects resource capability information as part of a resource table (132).

In a preferred embodiment, the request table (110) and the resource table (132) are preferably implemented as part of a relational database. A process of rational statistical inference (150) analyzes each client request to assign a pattern classification so that its expected demand on resources can be predicted using the pattern classification in the adaptive request table (110).

One of the primary responsibilities of the request examiner (120) of the VXT (100) is to examine all incoming requests and to prioritize these requests based on criteria that can be described in general as (1) categorical criteria such as product searching, price, comparison, online shopping, web surfing, audio streaming, and video downloads, and (2) demographic criteria such as the origin of the request and possible user profile. Comparing these attributes with a dynamic, relational database that records past requests and their behavior along with a process of rational statistical inference (150) permits the VXT (100) to estimate each client request's (102) resource requirements in terms of CPU availability, memory availability, and bandwidth or connectivity of the servers (104).

The purpose of the database and process of statistical inference (150) is to facilitate the construction of an adaptive request table (110) containing several generic request types or pattern classifications that are most likely to be received by the proxy server (12). Each request type is assigned a set of at least five parameters or resource requirement metrics (114) that reflect different requirement aspects for the respective request. The values assigned to these five parameters form a requirements vector (116) that prescribes the generic request's expected resource requirements in terms of CPU time, memory, bandwidth or connectivity for storage, bandwidth or connectivity to the main proxy server, and bandwidth or connectivity to peer servers (i.e., connectivity between content servers). When a request from the Internet comes in, the request examiner (120) compares the request with the patterns (112) contained in the adaptive request table (110), finds the closest match, and creates a requirement vector (116) including the five corresponding resource parameters.

Figure 3:
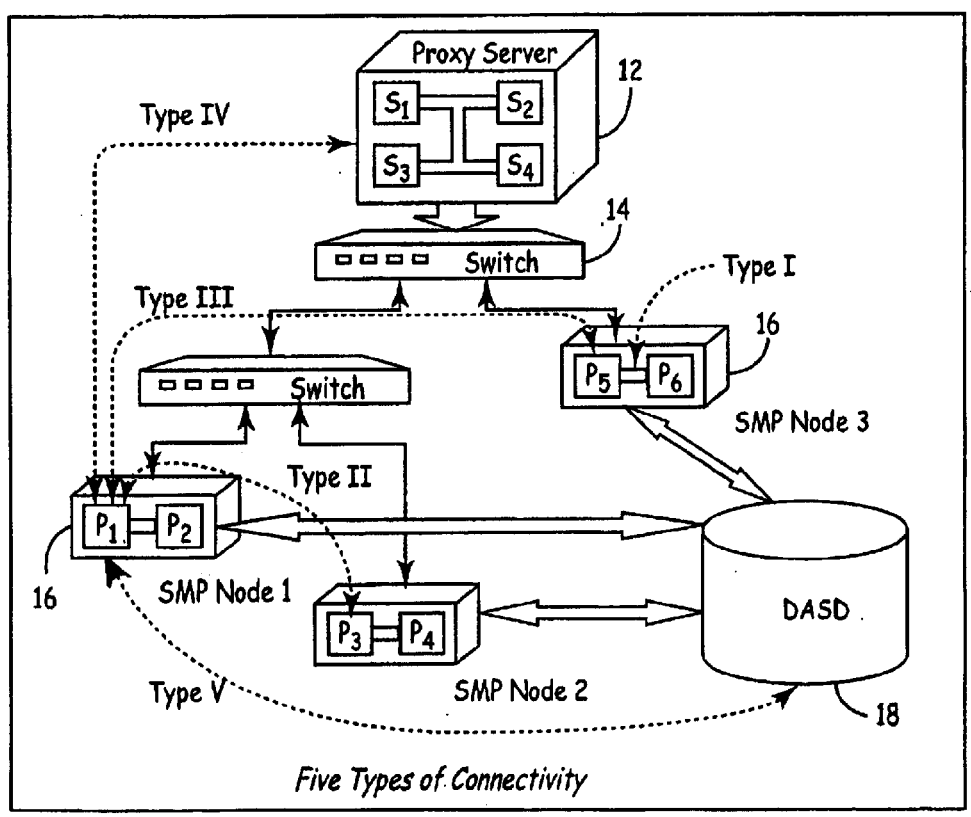
FIG. 3 illustrates five types of inter-processor connectivity for a system with multiple servers.

With reference to FIG. 3, a functional and cost effective system (10) should have at least two levels of networked servers. The lowest level consists of a collection of symmetric multiple processors (SMP) on the same bus. The bus should be a network having an aggregate bandwidth greater than 1 Gbps and very low latency. The next level is a collection of SMPs on one or more switches with less than 1 Gbps bandwidth and higher latency. The VXT (100) is designed to intelligently handle the added complexities of such an ASP system.

The VXT (100) ranks the available servers according to specific ranking criteria and servers' current running status in CPU availability, memory availability, storage connectivity, main proxy server connectivity, and pear server connectivity and generates a resource table (132) summarizing the resource capability metric (134) in a capability vector (136).

In a dynamic environment, each processor is capable of handling more than one task at a time, whether it is performing a price comparison or a search for a specific consumer item. The CPU availability parameter is defined in absolute terms as the unused portion of each processor's computing power measured in units of millions of instructions per second (MIPS).

The memory availability parameter is defined in absolute terms as the unused portion of each node's shared memory measured in units of megabytes divided by the number of processors in the node. This is because for SMP systems with several, processors (usually 4 to 8) in each node, the amount of memory available to one particular processor cannot be determined as the memory is shared among all processors in the same node.

Connectivity is a complex matter. In most systems, each processor has five different communication partners. Latency (determined by hardware) and available bandwidth (determined by current utilization) should be ascertained for each of these partners. Figure four identifies five types of inter-processor connectivity with a wide range of latency and bandwidth. Type I connectivity is between processors on the same node. Type II connectivity is between processors on different nodes, but on the same switch. Type III connectivity is between processors on different switches (for which a new parameter should be introduced to represent the number of hops to reach the partner processor). Type IV connectivity is between the processor and the proxy server. Type V connectivity is between the processor and the main storage system. Presently most ASP systems are not sophisticated enough to take advantage of the inter-processor connectivity information, i.e., Types II and III connectivity, so VXT (100) combines Types II and III connectivity into an aggregate connectivity. Three parameters are defined to represent available main proxy connectivity, central storage connectivity, and peer server connectivity. These parameters are bandwidths measured in units of Mbps recorded by the system status monitor.

Once all this information for incoming Internet requests and system resources is captured for a given time interval, it must be reduced to form a metric representation that can be manipulated to compute the best assignments of requests to resources. The metrics associated with each request forms a requirement vector (116) whose elements represent the requirement level of each of the parameters used in the decision process. The metrics associated with the ability of a particular server (104) to satisfy the request (102) is referred to as a capability vector (136). Each element of this vector (136) has a counterpart in the requirement vector (116). During operations, each request (102) has its own requirement vector (116), and each server or processing node (104) has its own capability vector (136). The vector space distance between the requirement vector (116) and capability vectors (136) for any given pairing of request (102) and server (104) represents the degree of mismatch (cost) incurred by the corresponding assignment of the request to that server. If the vectors are identical, the cost is zero.

The assignment of multiple simultaneous requests (102) can be done in several ways. As described above, the preferred approach creates a requirement vector (116) for each request (102) and capability vector (136) for each resource (104). The distance vector between each pair of request to resource then becomes an element in a cost matrix whereby the row index is a request identifier and the column index is the resource identifier. The cost matrix is usually sparse since some assignments may be ruled out for simple reasons. A decision-making algorithm then selects a resource for each request so that the sum of all the costs in the matrix is minimized for all combinations of requests and resources. There are several minimization techniques available, such as general neural network techniques, simulated annealing methods and generic assignment algorithm approaches.

The preferred algorithm provides a fast quasi-optimal solution to the distribution problem based on standard methods. One example of such a standard method is a neural network paradigm as described in U.S. Pat. No. 5,548,683, the disclosure of which is hereby incorporated by reference. Other examples of generic algorithm approach would be a greedy search solution algorithm. A greedy algorithm can be applied when the optimization problem is to decide whether or not to include some element from a given set. A greedy algorithm begins with no elements and sequentially selects an element from the feasible set of remaining elements by myopic optimization. (The elements could have been sorted by some criterion, such as associated weights.) This results in an optimal solution to the problem if, and only if, there is an underlying matroid structure (for example, a spanning tree). Other types of generic assignment algorithms would include auction algorithms or Munres algorithms.

Although the preferred embodiment has been described herein, numerous changes and variations can be made and the scope of the present invention is intended to be defined by the claims.

What is claimed is:

1. A method for distributing incoming client requests across multiple servers in a networked client-server computer environment comprising:
   (a) collecting client requests incoming within a predetermined time interval;
   (b) upon receipt of the at least two incoming client requests within the predetermined time interval, analyzing each of the client requests using categorical criteria and demographic criteria to extract attributes of the request;
   (c) classifying the client requests based on the extracted attributes by comparing each request with a pattern selected from a set of patterns in an adaptive request table to find a match-pattern that best matches the request;
   (d) using the match-pattern to associate a requirements vector with each request, the requirements vector being populated with at least five resource parameters that prescribe the expected resource requirements of the request;
   (e) capturing resource capability information for each server at least once during the predetermined time interval, each server being associated with a capability vector refreshed with the resource capability information;
   (f) following steps (d) and (e), for each client request and server pair, computing a vector space distance between the requirement vectors and capability vectors corresponding to the client request and the server respectively, the vector space distance being an update to an element in a cost matrix initialized at the start of the predetermined time interval;
   (g) at the completion of the time interval, distributing the client requests across multiple servers to minimize a cost metric associated with the cost matrix for all combinations of client requests and server resource capabilities; and
   (h) repeating steps (a) through (g) for subsequent ones of said time interval after initializing the cost matrix.

2. The method of claim 1, wherein said resource capability information comprises a resource capability metric for each of at least five resource parameters for each server, regarding the server's CPU availability, memory availability, connectivity to storage, connectivity to a proxy server, and connectivity to peer servers.

3. The method of claim 2, wherein said method further comprises the step of providing a dynamic, relational database and process of statistical inference for ascertaining expected demand patterns involving said at least one attribute.

4. The method of claim 3, wherein the number of said expected demand patterns can dynamically increase or decrease.

5. The method of claim 3, wherein a resource requirement metric for each of said at least five resource parameters is assigned to each said expected demand pattern, wherein each said collected request is identified with at least one said expected demand pattern, and wherein said resource requirement metrics assigned to said identifying expected demand pattern are further assigned to said collected request.

6. The method of claim 5, further comprising the steps of determining the metric distance between said resource requirement metrics and said resource capability metrics for at least one combination of said collected client request and server pairings and selecting a server for each said collected request so that the sum of said metric distances for said at least one combination of said pairings is minimized.

7. The method of claim 6, wherein an optimization paradigm is used to at least partially perform the step of selecting a server for each said collected request so that the sum of said metric distances for said at least one combination of said pairings is minimized.

8. A system for servicing multiple requests to be distributed across multiple servers in a networked client-server computer environment, the system comprising:

a request examiner routine for analyzing each of the client requests incoming within a predefined time interval, using categorical criteria and demographic criteria to extract attributes of the request;

a request table for collecting attribute information associated with each client request incoming within the predetermined time interval;

an adaptive request table populated with a set of patterns, each pattern associated with a generic request type that is most likely to be received by a proxy server, the adaptive request table suited for classifying client requests by comparing each request with a pattern selected from the set of patterns in the adaptive request table to find a match-pattern that best matches the client request resulting in a successful match, so that an expected demand on resources by the client request can be predicted using the match-pattern in the adaptive request table to associate a requirements vector with each request, the requirements vector being populated with at least five resource parameters that prescribe the expected demand on resources imposed by the request;

a relational database coupled with a process of statistical inference to facilitate the construction of an adaptive request table, the adaptive request table being updated by the process of statistical inference for each match-pattern resulting from a successful match of the client request with the set of patterns;

a resource table for collecting resource capability information about each server at least once during the predetermined time interval wherein each server is associated with a capability vector refreshed with the resource capability information;

a cost matrix initialized at the start of the time interval, the cost matrix characterized by a row index associated with a request identifier and a column index associated with a resource identifier, each element in the cost matrix representing a vector space distance between the requirements vector corresponding to the client reguest and the capability vector corresponding to the server resource;

a distance vector computing process for computing the vector space distance between the requirements vector and the capability vector for each pairing of the client request and the server resource; and an optimization and allocation process for selecting a server resource for receiving each client request so that a sum of all costs in the cost matrix is minimized for all combinations of client requests and server resources.

9. The system of claim 8, wherein said resource capability information comprises a resource capability metric for each of at least a plurality of resource parameters for each server selected from the set comprising: the server's CPU availability, memory availability, connectivity to storage, connectivity to a proxy server, connectivity to peer servers, and connectivity to the Internet.

10. The system of claim 8, wherein the relational database is dynamic and wherein the number of said patterns can dynamically increase or decrease.

11. The system of claim 8, wherein the requirements vector associated with one request among the client requests incoming within the predefined time interval is further assigned to all said client requests incoming within the predefined time interval.

12. The system of claim 8, wherein the optimization and allocation process for selecting a server resource for receiving each client request is configured so that the sum of all costs in the cost matrix is minimized for at least one combination of client requests and server resources.

13. The system of claim 8, wherein a global optimization paradigm is used to minimize a total assignment cost for the said all combinations of client requests and server resources.

* * * * *